United States Patent
Hiramatsu et al.

(10) Patent No.: US 7,298,692 B2
(45) Date of Patent: Nov. 20, 2007

(54) RADIO BASE STATION APPARATUS AND COMMUNICATION TERMINAL

(75) Inventors: Katsuhiko Hiramatsu, Yokosuka (JP); Kenichi Miyoshi, Yokohama (JP); Atsushi Sumasu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 948 days.

(21) Appl. No.: 10/312,870

(22) PCT Filed: May 13, 2002

(86) PCT No.: PCT/JP02/04590

§ 371 (c)(1),
(2), (4) Date: Jan. 2, 2003

(87) PCT Pub. No.: WO02/093962

PCT Pub. Date: Nov. 21, 2002

(65) Prior Publication Data
US 2003/0147358 A1    Aug. 7, 2003

(30) Foreign Application Priority Data
May 16, 2001    (JP) ............................. 2001-146576

(51) Int. Cl.
*H04J 11/00* (2006.01)
(52) U.S. Cl. .................. 370/208; 370/210; 370/211
(58) Field of Classification Search ............ 370/535, 370/537, 319, 324, 338, 344, 349, 350, 503, 370/517, 519, 202, 208, 210, 211; 375/130–153, 375/242–254; 455/63.1, 67.13
See application file for complete search history.

(56) References Cited

U.S. PATENT DOCUMENTS 3,735,266 A * 5/1973 Amitay .................. 370/201

(Continued)

FOREIGN PATENT DOCUMENTS

JP    2000 244441    9/2000

(Continued)

OTHER PUBLICATIONS

Y. Asai, et al.; "Coded OFDM System using Guard Interval Length Control", B-5-92, Wireless Systems Innovation Laboratory, NTT Network Innovation Laboratories, pg. 490 w/English translation.

*Primary Examiner*—Ricky Q Ngo
*Assistant Examiner*—Gary Mui
(74) *Attorney, Agent, or Firm*—Stevens, Davis, Miller & Mosher, LLP (57) ABSTRACT

MS receives a downlink signal transmitted based on a guard interval determined using a delay profile with high accuracy generated based on a CDMA uplink signal, and performs Fourier Transform processing on a preamble portion of the downlink signal to demodulate. Transmission parameters (guard interval, subcarrier frequency interval and the number of subcarriers) contained in the preamble portion are extracted and output to Fourier Transform section 303. The section 303 performs Fourier Transform processing on a data portion based on the extracted transmission parameters. Demodulation section 304 demodulates signals subjected to the Fourier Transform processing to output as received data. It is thereby possible to generate the delay profile with high accuracy to determine the guard interval, and to ensure transmission quality while improving the spectral efficiency.

9 Claims, 9 Drawing Sheets

U.S. PATENT DOCUMENTS

| | | | |
|---|---|---|---|
| 5,568,472 A * | 10/1996 | Umeda et al. | 370/342 |
| 5,867,527 A * | 2/1999 | Ziv et al. | 375/147 |
| 6,067,292 A * | 5/2000 | Huang et al. | 370/342 |
| 6,097,711 A * | 8/2000 | Okawa et al. | 370/335 |
| 6,097,715 A * | 8/2000 | Ichihara | 370/342 |
| 6,219,391 B1 * | 4/2001 | Nakano | 375/346 |
| 6,282,185 B1 * | 8/2001 | Hakkinen et al. | 370/342 |
| 6,373,861 B1 * | 4/2002 | Lee | 370/503 |
| 6,381,233 B1 * | 4/2002 | Sunaga | 370/335 |
| 6,438,367 B1 * | 8/2002 | Crawford | 455/410 |
| 6,535,501 B1 * | 3/2003 | Bohnke | 370/345 |
| 7,110,387 B1 * | 9/2006 | Kim et al. | 370/344 |
| 7,161,895 B1 * | 1/2007 | Sudo | 370/204 |
| 2001/0012316 A1 * | 8/2001 | Maruyama | 375/148 |
| 2002/0039347 A1 * | 4/2002 | Matsugatani et al. | 370/203 |
| 2003/0012126 A1 * | 1/2003 | Sudo | 370/203 |
| 2003/0031121 A1 * | 2/2003 | Sudo | 370/203 |
| 2003/0072254 A1 * | 4/2003 | Ma et al. | 370/208 |
| 2004/0228272 A1 * | 11/2004 | Hasegawa et al. | 370/210 |
| 2005/0013383 A1 * | 1/2005 | Sudo et al. | 375/260 |
| 2005/0025087 A1 * | 2/2005 | Tamura | 370/320 |
| 2005/0254414 A1 * | 11/2005 | Suda et al. | 370/203 |

FOREIGN PATENT DOCUMENTS

JP    2001 111519    4/2001

* cited by examiner

# RADIO BASE STATION APPARATUS AND COMMUNICATION TERMINAL

TECHNICAL FIELD

The present invention relates to a radio base station apparatus and communication terminal apparatus used in a digital radio communication system.

BACKGROUND ART

In recent years, attention has been drawn to an OFDM (Orthogonal Frequency Division Multiplexing) transmission system high in resistance to multipath interference that is a main factor in deterioration of transmission performance on transmission paths. OFDM is such a system that multiplexes a large number of (a few tens to hundreds) digital modulated signals with frequencies orthogonal to each other at a signal interval.

One of communication methods using OFDM transmission is disclosed in "Coded OFDM System using Guard Interval Length Control" IEICE, General Conference, B-5-92, 2001.

In this communication method, a base station (described as an access point in the above document) receives a known signal (preamble) transmitted from a mobile apparatus (described as a mobile terminal in the above document) and using the known signal, generates a delay profile, while measuring Carrier to Noise ratio (C/N ratio). Using the delay profile and C/N ratio, the base station determines an optimal guard interval, the modulation level of M-ary modulation and coding rate of FEC (Forward Error Correction) to transmit over the downlink.

Since the communication method employs a TDMA/TDD (Time Division Multiple Access/Time Division Duplex) system as an access scheme, the reversibility is used of transmission paths over the uplink (communication terminal to base station) and downlink (base station to communication terminal).

The communication method employs OFDM over both the uplink and downlink. In OFDM, by increasing the duration of a symbol, effects of delayed versions are decreased. Accordingly, since the duration of a symbol is increased, time resolution is insufficient, and it is thereby impossible to measure a delay profile accurately. When a guard interval is determined based on a delay profile generated under such a condition that the time resolution is insufficient, there is a risk that an unnecessary time is also set as a guard interval and the spectral efficiency deteriorates.

DISCLOSURE OF INVENTION

The present invention is carried out in view of the foregoing, and it is an object of the present invention to provide a radio base station apparatus and communication terminal apparatus that generate delay profiles with high accuracy to determine guard intervals so as to ensure the transmission quality while improving the spectral efficiency.

The inventor of the present invention focused on that it is difficult to measure the delay profile using OFDM signals, found out by using the fact that delay profiles are not different between the uplink and downlink, the delay profile is generated with high accuracy using uplink DS/CDMA (Direct Sequence/Code Division Multiple Access) signals, and determining a guard interval using such a delay profile makes it possible to ensure the transmission quality and to improve the spectral efficiency, and reached the present invention.

In other words, the object of the present invention is achieved by using OFDM signals or OFDM/CDMA signals over the downlink and CDMA signals over the uplink, generating delay profiles using the CDMA signals, and determining guard intervals using the delay profiles.

BEST MODE FOR CARRYING OUT THE INVENTION

Figure 1:
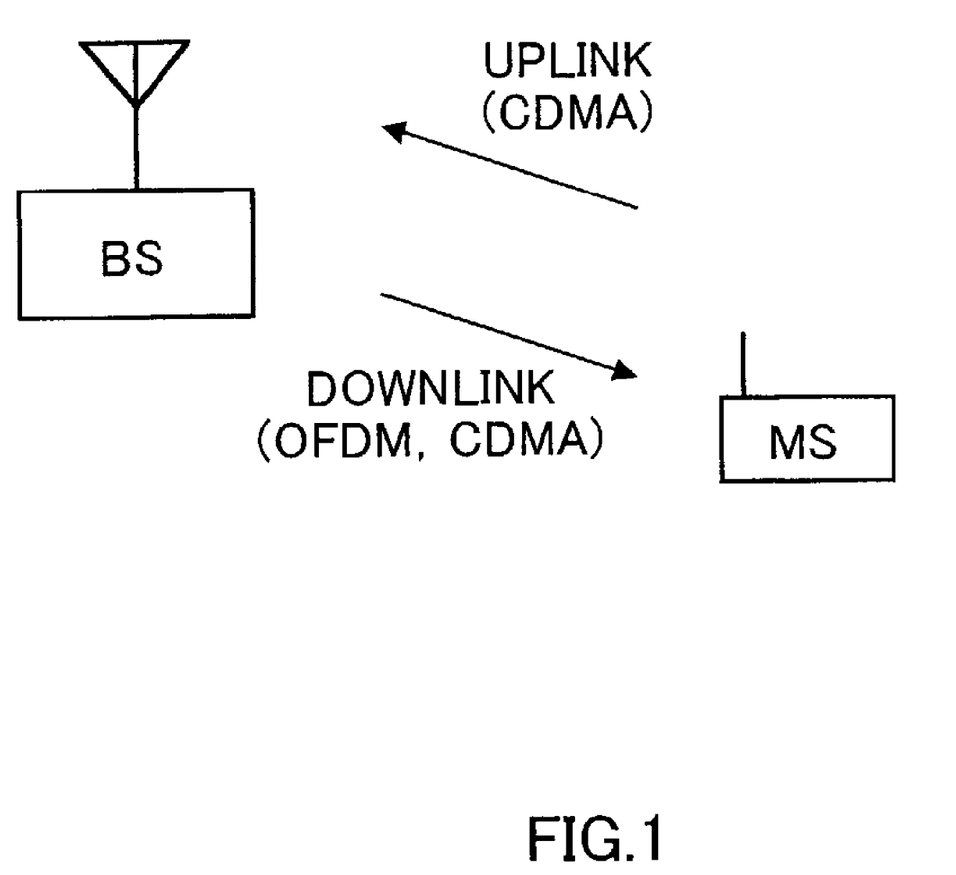
FIG. 1 is a diagram to explain communications between a radio base station apparatus and communication terminal apparatus of the present invention.

The present invention aims to ensure the transmission quality while improving the spectral efficiency, by using OFDM signals or OFDM/CDMA signals over the downlink and CDMA signals over the uplink as shown in FIG. 1, generating delay profiles using the CDMA signals, and determining guard intervals using the delay profiles.

Embodiments of the present invention will be described below with reference to accompanying drawings.

First Embodiment

This embodiment explains a case that CDMA is used as an access system over the uplink, and that abase station generates delay profiles accurately to determine guard intervals.

Figure 2:
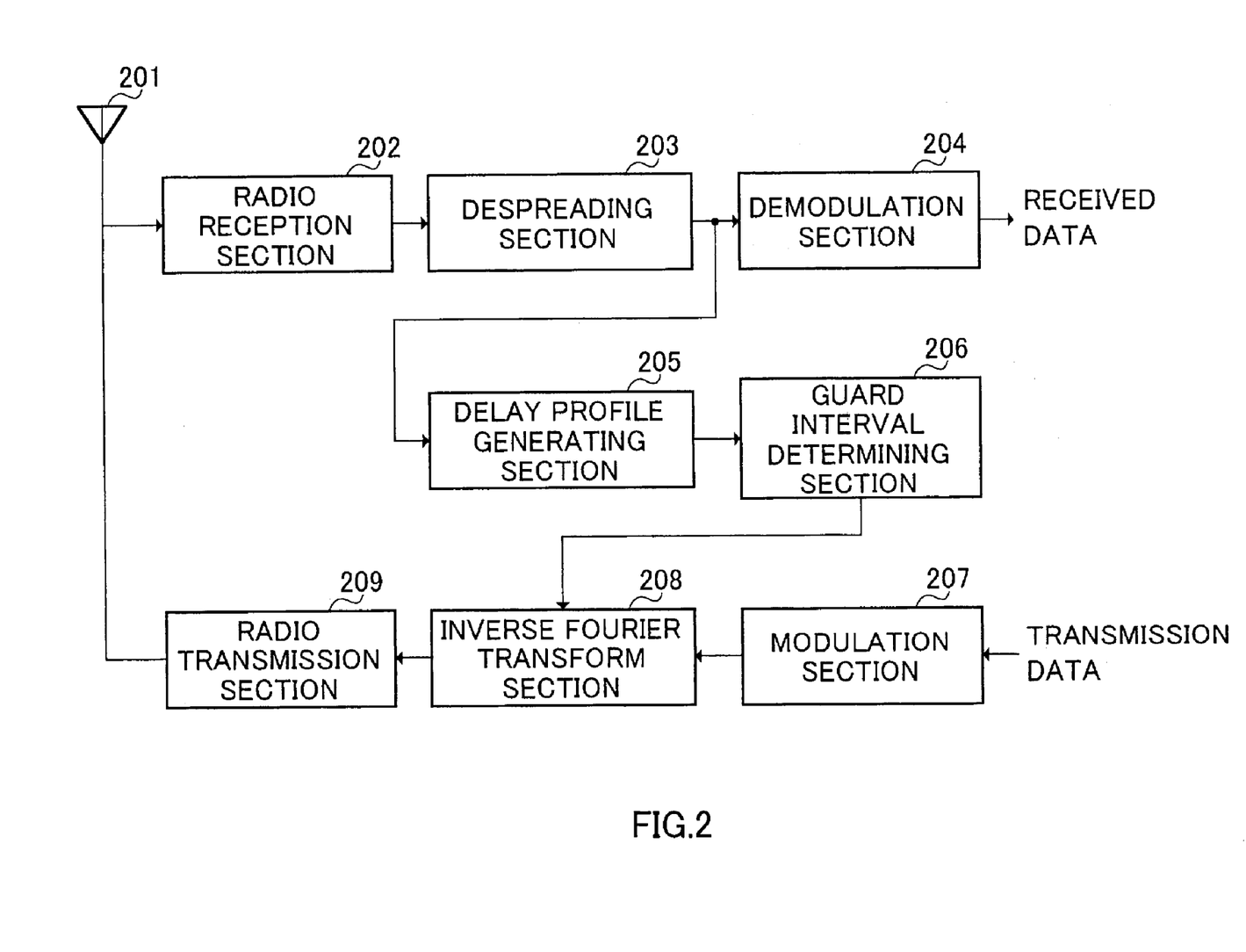
FIG. 2 is a block diagram illustrating a configuration of a radio base station apparatus according to a first embodiment of the present invention.

FIG. 2 is a block diagram illustrating a configuration of a radio base station apparatus (hereinafter abbreviated as BS when necessary) according to the first embodiment of the present invention.

An uplink signal transmitted from a communication terminal apparatus (hereinafter referred to as MS when necessary) is received in radio reception section 202 through antenna 201. Radio reception section 202 performs predetermined reception processing (such as, for example, downconverting and A/D conversion) on the uplink signal, and outputs the radio-reception-processing processed signal to despreading section 203.

Despreading section 203 performs despreading on the radio-reception-processing processed signal with the same spreading code as used in MS, and outputs the despread signal to demodulation section 204 and delay profile generating section 205. Demodulation section 204 demodulates the despread signal and outputs received data.

Delay profile generating section 205 generates a delay profile using the despread signal. The delay profile is output to guard interval determining section 206. Using the delay profile, guard interval determining section 206 determines a guard interval. Information of the determined guard interval is output to Inverse Fourier Transform section 208.

Figure 4:
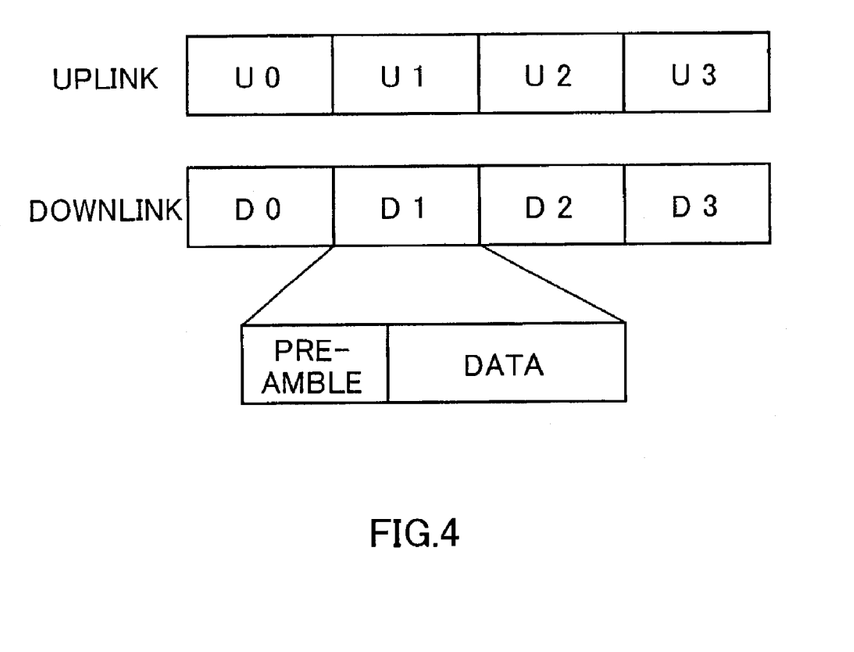
FIG. 4 is a diagram showing frame formats of a downlink signal and uplink signal.

Transmission parameters such as the guard interval, subcarrier frequency interval and the number of subcarriers are inserted into a preamble portion of transmission data. Accordingly, a frame of downlink signal has a format as shown in FIG. 4, and includes a preamble portion and data portion. Transmission data including the preamble is modulated in modulation section 207, and the modulated signal is output to Inverse Fourier Transform section 208.

Inverse Fourier Transform section 208 performs on the modulated signal OFDM processing (modulation) and Inverse Fourier Transform processing, for example, IDFT (Inverse Discrete Fourier Transform) and IFFT (Inverse Fast Fourier Transform), and outputs the IFT processed signal to radio transmission section 209. Radio transmission section 209 performs predetermined radio transmission processing (such as, for example, D/A conversion and upconverting) on the OFDM signal, and transmits the resultant radio signal to MS as a downlink signal through antenna 201.

Figure 3:
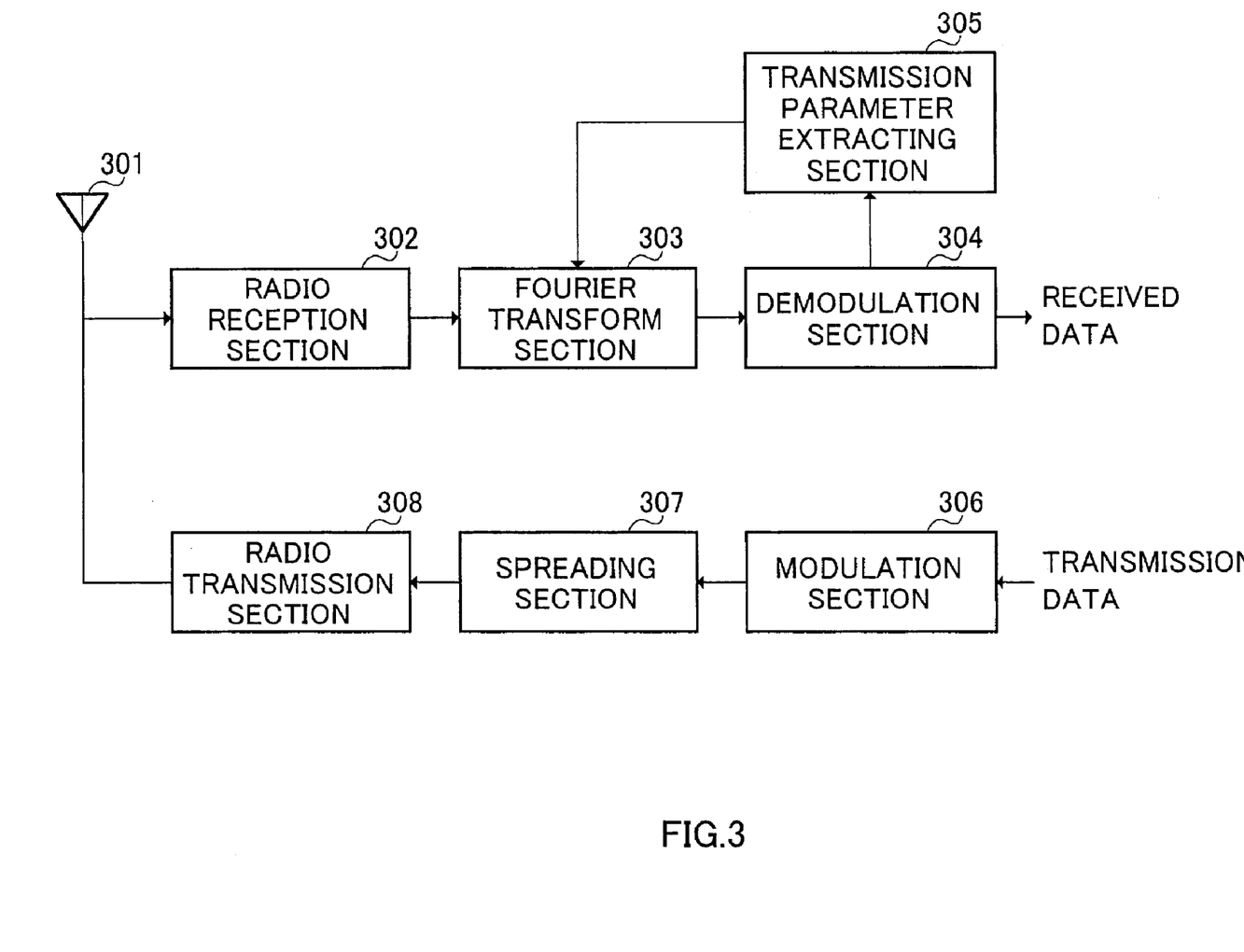
FIG. 3 is a block diagram illustrating a configuration of a communication terminal apparatus according to the first embodiment of the present invention.

FIG. 3 is a block diagram illustrating a configuration of MS according to the first embodiment of the present invention.

A downlink signal transmitted from BS is received in radio reception section 302 through antenna 301. Radio reception section 302 performs predetermined reception processing (such as, for example, downconverting and A/D conversion) on the downlink signal, and outputs the radio-reception-processing processed signal to Fourier Transform section 303.

Fourier Transform section 303 performs on the radio-reception-processing processed signal OFDM processing (demodulation) and Fourier Transform processing, for example, DFT (Discrete Fourier Transform) and FFT (Fast Fourier Transform), and outputs the FT processed signal to demodulation section 304. Demodulation section 304 demodulates the FT processed signal and outputs received data.

The demodulated signal is output to transmission parameter extracting section 305. Transmission parameter extracting section 305 extracts a preamble portion from the demodulated signal, and recognizes transmission parameters from the preamble portion. The transmission parameters are output to Fourier Transform section 303. Fourier Transform section 303 performs Fourier Transform based on the transmission parameters transmitted from BS.

Transmission data is modulated in modulation section 306, and the modulated signal is output to spreading section 307. Spreading section 307 performs spreading on the modulated signal with a predetermined spreading code, and outputs the spread signal to radio transmission section 308. Radio transmission section 308 performs predetermined radio transmission processing (such as, for example, D/A conversion and upconverting) on the spread signal, and transmits the resultant radio signal to BS as an uplink signal through antenna 301.

A case will be described below where BS and MS with the above-mentioned configurations perform radio communications according to the present invention.

MS as illustrated in FIG. 3 modulates transmission data, spreads the data in spreading section 307, and transmits the spread signal (CDMA signal) to BS as an uplink signal.

When receiving the uplink signal (CDMA signal), BS despreads the CDMA signal in despreading section 203, and generates a delay profile using the despread signal in delay profile generating section 205.

At this point, since CDMA signals have higher time resolution than OFDM signals, it is possible to generate a delay profile with high accuracy. In other words, as described above, in OFDM, the duration of a symbol is increased to decrease effects of delayed version, which becomes a factor in degrading the accuracy of delay profile generation. Meanwhile, in CDMA, since processing is performed for accurately detecting delayed versions to combine, it is necessary to generate delay profiles with accuracy for the processing. Further, since delayed versions are combined instead of decreasing effects of delayed versions, it is not necessary to increase the duration of a symbol to decrease effects of delayed versions, unlike OFDM. Therefore, CDMA signals have higher time resolution than OFDM signals. As a result, using CDMA signals is capable of generating delay profiles with higher accuracy than using OFDM signals.

Figure 5:
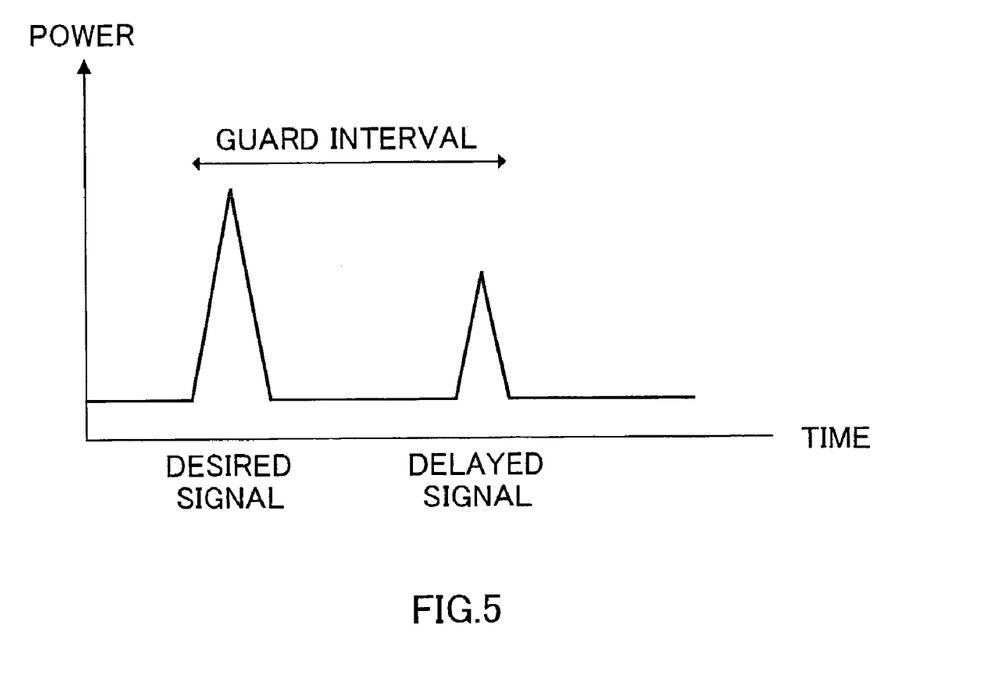
FIG. 5 is a diagram to explain a delay profile used in selecting a guard interval.

The delay profile generated in delay profile generating section 205 is output to guard interval determining section 206 and is used to determine a guard interval. Specifically, the guard interval in OFDM is set at a time interval to include delayed versions so as to prevent the reception quality from deteriorating due to the delayed versions. For example, as shown in FIG. 5, a guard interval is set at a time interval including a desired signal and a delayed signal.

Thus determined guard interval is output to Inverse Fourier Transform section 208 as transmission parameter information of OFDM. Information of subcarrier frequency interval and of the number of subcarriers that are of other transmission parameters is also output to Inverse Fourier Transform section 208. These transmission parameters (guard interval, subcarrier frequency interval and the number of subcarriers) are inserted into a preamble portion of transmission data to broadcast MS.

As illustrated in FIG. 4, the preamble portion containing the transmission parameters is modulated as transmission data as well as a data portion, and subsequently undergoes Inverse Fourier Transform processing to be an OFDM signal. At this point, the Inverse Fourier Transform processing is performed based on the transmission parameters (guard interval, subcarrier frequency interval and the number of subcarriers) in which the guard interval determined as described above is reflected. The IFT processed OFDM signal is transmitted to MS as a downlink signal.

When receiving the downlink signal, MS performs Fourier Transform processing on the preamble portion of the downlink signal to demodulate, and thus extracts transmission parameters inserted into the preamble portion. The transmission parameters (guard interval, subcarrier frequency interval and the number of subcarriers) are output to Fourier Transform section 303.

Fourier Transform section 303 performs Fourier Transform processing on the data portion based on the extracted transmission parameters. The FT processed signal is demodulated in demodulation section 304, and output as received data.

In this way, according to this embodiment, a CDMA signal is used to generate an accurate delay profile, and based on the delay profile a guard interval is determined, whereby the need is eliminated of setting a guard interval using an OFDM signal with insufficient time resolution and it is thereby possible to set guard intervals with high accuracy. It is thus possible to ensure the transmission quality while preventing a useless guard interval from being set and to improve the spectral efficiency.

Second Embodiment

This embodiment explains a case where a preamble portion for delay profile generation is of a CDMA signal, a data portion is of an OFDM signal, and both signals are multiplexed to be transmitted.

Figure 6:
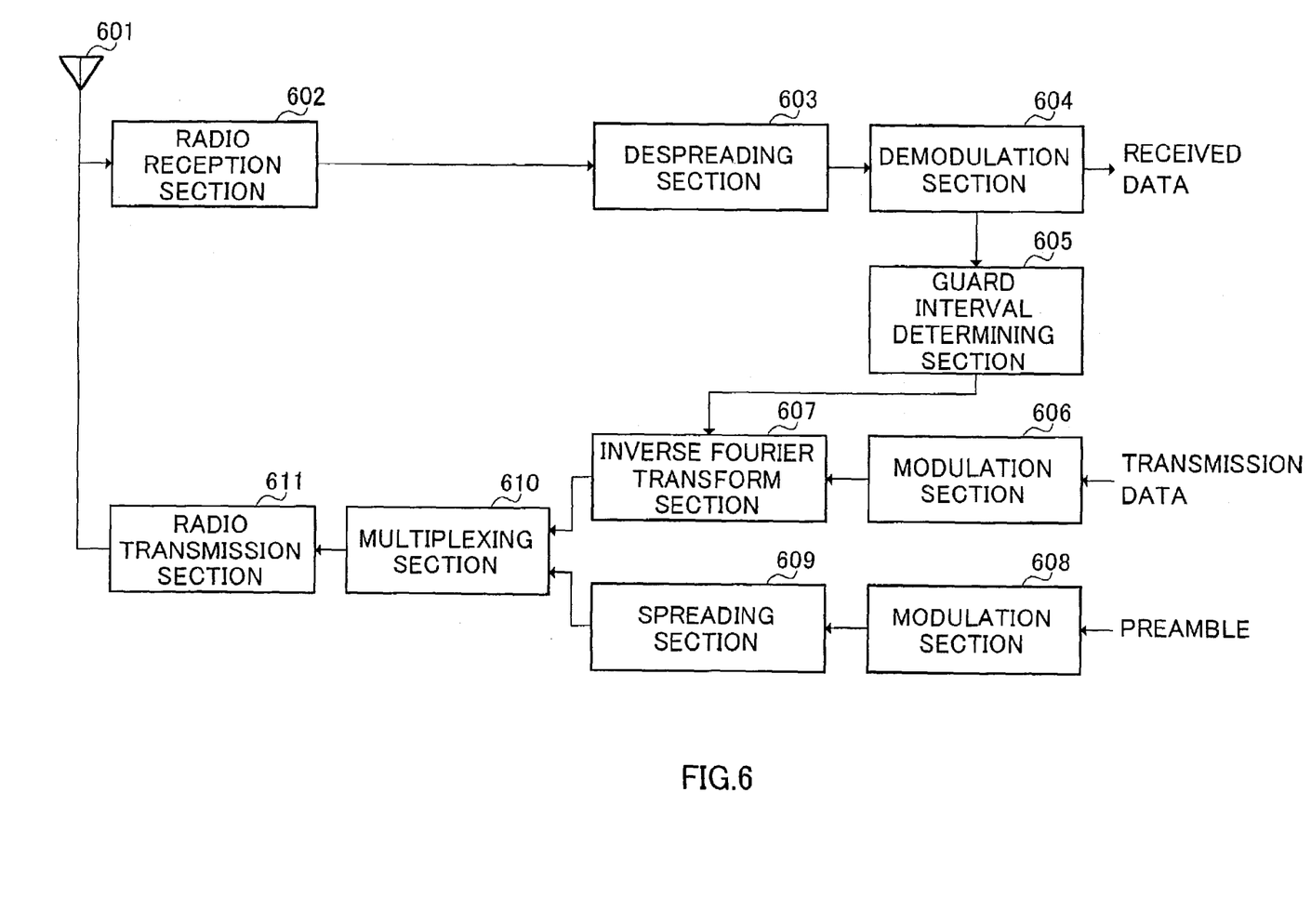
FIG. 6 is a block diagram illustrating a configuration of a radio base station apparatus according to a second embodiment of the present invention.

FIG. 6 is a block diagram illustrating a configuration of BS according to the second embodiment of the present invention.

An uplink signal transmitted from MS is received in radio reception section 602 through antenna 601. Radio reception section 602 performs predetermined reception processing (such as, for example, downconverting and A/D conversion) on the uplink signal, and outputs the radio-reception-processing processed signal to despreading section 603.

Despreading section 603 performs despreading on the radio-reception-processing processed signal with the same spreading code as used in MS, and outputs the despread signal to demodulation section 604. Demodulation section 604 demodulates the despread signal and outputs received data.

The demodulated received data is output to guard interval determining section 605. Guard interval determining section 605 determines a guard interval using information of delay profile transmitted in the uplink signal. The determined guard interval information is output to Inverse Fourier Transform section 607.

Transmission parameters such as the guard interval, sub-carrier frequency interval and the number of subcarriers are inserted into a preamble portion of transmission data. The preamble is modulated in modulation section 606, and the modulated signal (preamble portion) is output to spreading section 609. Spreading section 609 performs spreading on the modulated signal (preamble portion), and outputs the spread signal (CDMA signal) to multiplexing section 610.

Transmission data is modulated in modulation section 606, and the modulated signal (data portion) is output to Inverse Fourier Transform section 607. Inverse Fourier Transform section 607 performs Inverse Fourier Transform processing on the modulated signal (data portion), and outputs the IFT processed signal (OFDM signal) to multiplexing section 610.

Multiplexing section 610 multiplexes (time multiplexing or code multiplexing) the OFDM signal from Inverse Fourier Transform section 607 and the CDMA signal from spreading section 609. Thus, multiplexing section 610 has either configuration for time multiplexing or code multiplexing.

Figure 8:
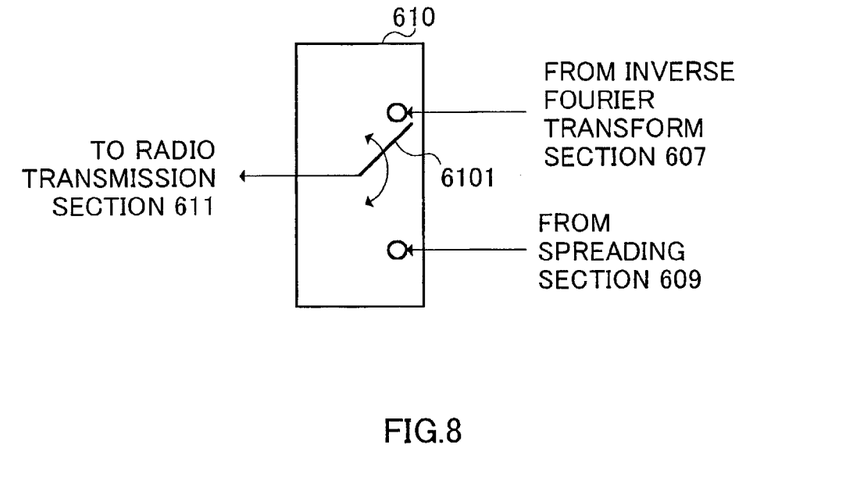
FIG. 8 is a diagram illustrating a configuration of a multiplexing section (time multiplexing) in the radio base station apparatus illustrated in FIG. 6.

FIG. 8 illustrates a configuration of multiplexing section 610 for performing time multiplexing on the OFDM signal and CDMA signal. Multiplexing section 610 as illustrated in FIG. 8 has switch 6101 for switching between outputs from Inverse Fourier Transform section 607 and from spreading section 609 to output to radio transmission section 611.

Figure 9:
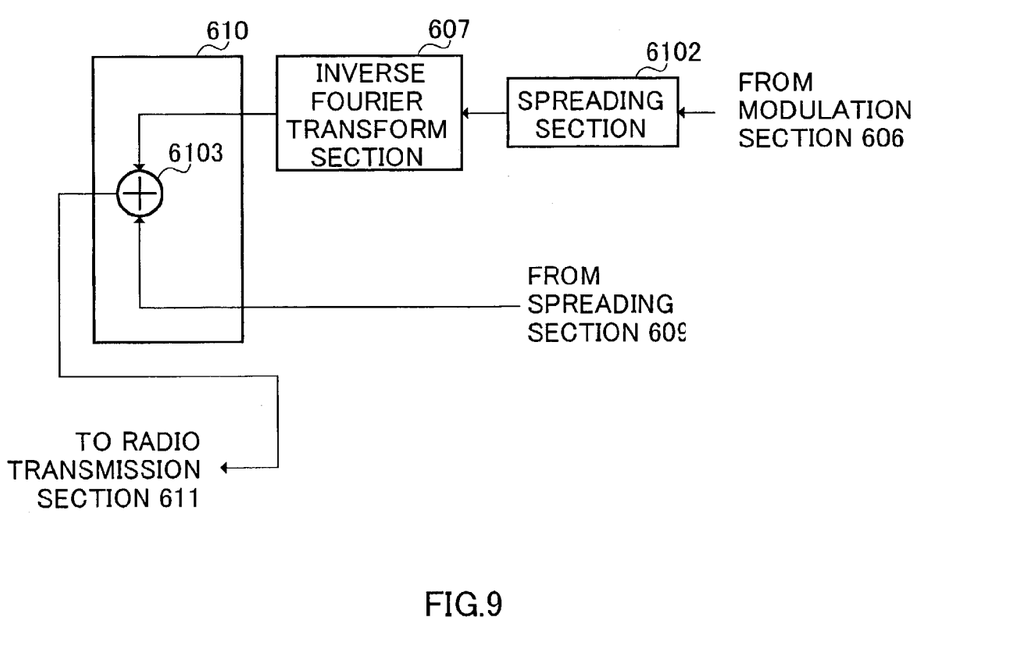
FIG. 9 is a diagram illustrating a configuration of a multiplexing section (code multiplexing) in the radio base station apparatus illustrated in FIG. 6.

FIG. 9 illustrates a configuration of multiplexing section 610 for performing code multiplexing on the OFDM signal and CDMA signal. In the case of performing code multiplexing on OFDM and CDMA signals, an OFDM signal needs to be an OFDM-CDMA signal. When chips of a spread signal are mapped onto OFDM to obtain the OFDM-CDMA signal, there is used a time-axis spreading method, frequency-axis spreading method or two-dimensional spreading method including time axis and frequency axis.

In FIG. 9, the modulated signal is subjected to spreading and subsequently to Inverse Fourier Transform, and is output to multiplexing section 610. In other words, in FIG. 9, spreading section 6102 is provided before Inverse Fourier Transform section 607, and multiplexing section 610 has adder 6103 that adds an output from Inverse Fourier Transform section 607 and an output from spreading section 609.

The multiplexed signal is output to radio transmission section 611. Radio transmission section 611 performs predetermined radio transmission processing (such as, for example, D/A conversion and upconverting) on the multiplexed signal, and transmits the resultant radio signal to MS as a downlink signal through antenna 601.

Figure 7:
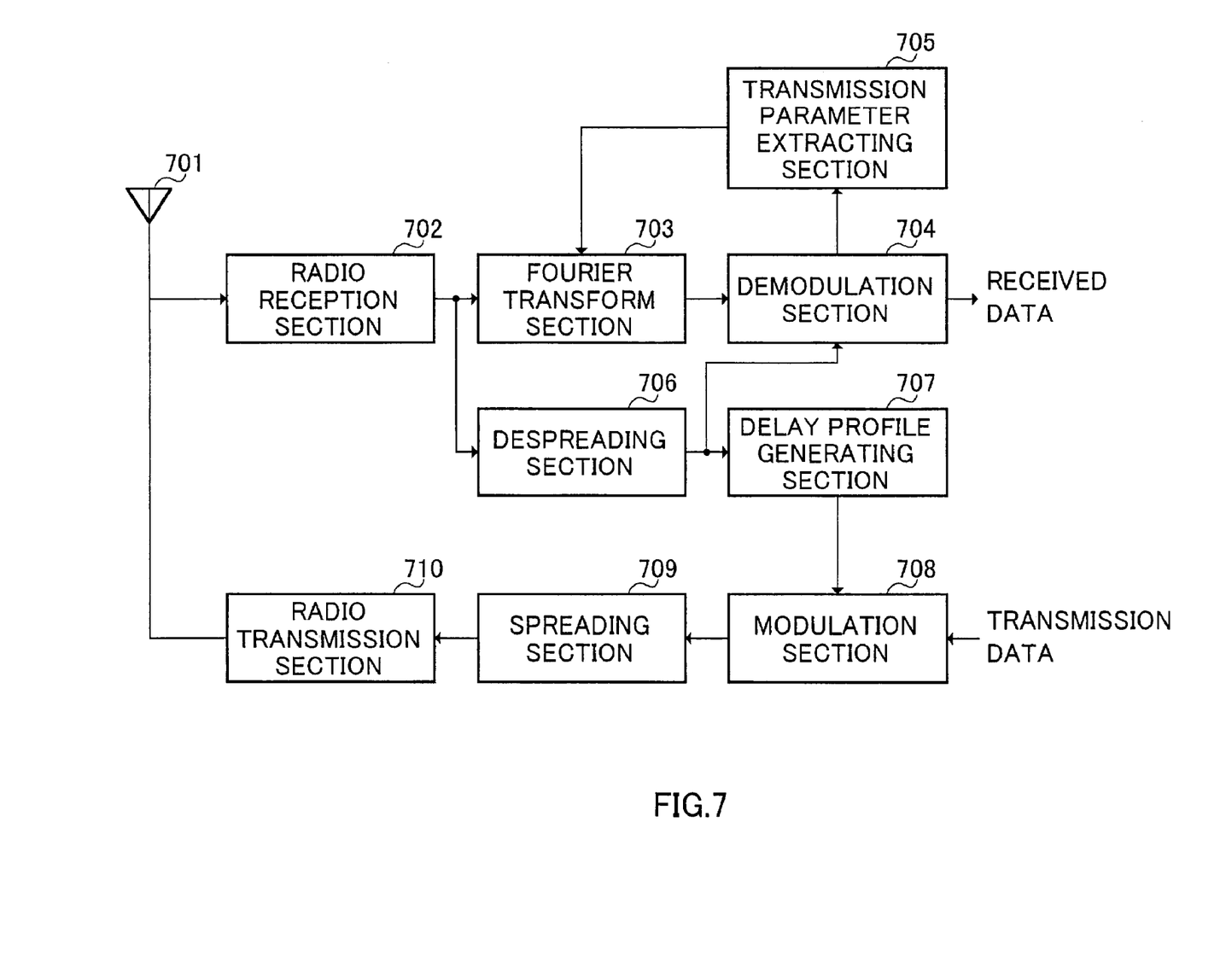
FIG. 7 is a block diagram illustrating a configuration of a communication terminal apparatus according to the second embodiment of the present invention.

FIG. 7 is a block diagram illustrating a configuration of MS according to the second embodiment of the present invention.

A downlink signal transmitted from BS is received in radio reception section 702 through antenna 701. Radio reception section 702 performs predetermined reception processing (such as, for example, downconverting and A/D conversion) on the downlink signal, and outputs the radio-reception-processing processed signal to Fourier Transform section 703 and despreading section 706.

Fourier Transform section 703 performs Fourier Transform processing on the radio-reception-processing processed signal, and outputs the FT processed signal to demodulation section 704. Demodulation section 704 demodulates the FT processed signal and outputs received data.

Despreading section 706 performs despreading on the radio-reception-processing processed signal with the same spreading code as used in BS, and outputs the despread signal to demodulation section 704 and delay profile generating section 707. Demodulation section 704 demodulates the despread signal, and outputs the demodulated signal to transmission parameter extracting section 705.

Transmission parameter extracting section 705 extracts a preamble portion from the demodulated signal, and recognizes transmission parameters from the preamble portion. The transmission parameters are output to Fourier Transform section 703. Fourier Transform section 703 performs Fourier Transform based on the transmission parameters transmitted from BS.

Delay profile generating section 707 generates a delay profile using the despread signal. The delay profile is output to modulation section 708. Transmission data and the delay profile are modulated in modulation section 708, and the modulated signal is output to spreading section 709. Spreading section 709 performs spreading on the modulated signal with a predetermined spreading code, and outputs the spread signal to radio transmission section 710. Radio transmission section 710 performs predetermined radio transmission processing (such as, for example, D/A conversion and upconverting) on the spread signal, and transmits the resultant radio signal to BS as an uplink signal through antenna 701.

A case will be described below where BS and MS with the above-mentioned configurations perform radio communications according to the present invention.

BS as illustrated in FIG. 6 modulates the preamble, spreads the resultant in spreading section 609, and outputs the spread signal (CDMA signal) to multiplexing section 610. Multiplexing section 610 multiplexes the CDMA signal and OFDM signal, and transmits the multiplexed signal to MS as a downlink signal. The multiplexing of OFDM and CDMA signals will be described later.

When receiving the downlink signal (multiplexed signal), MS as illustrated in FIG. 7 despreads the CDMA signal of the preamble portion in despreading section 706, and generates a delay profile using the despread signal in delay profile generating section 707. The delay profile is generated using the CDMA signal with high time resolution, and, therefore, is generated with high accuracy. The information of the delay profile is output to modulation section 708.

MS modulates transmission data and the information of delay profile in modulation section 708, spreads the resultant in spreading section 709, and transmits the spread signal (CDMA signal) to BS as an uplink signal.

When receiving the uplink signal (CDMA signal), BS despreads the CDMA signal in despreading section 603, and demodulates the despread signal in demodulation section 604.

The information of delay profile, contained in the uplink signal, obtained by demodulation is output to guard interval determining section 605.

As in the first embodiment, guard interval determining section 605 determines a guard interval using the delay profile. Thus determined guard interval is output to Inverse Fourier Transform section 607 as transmission parameter information of OFDM. Information of subcarrier frequency interval and of the number of subcarriers that are of other transmission parameters is also output to Inverse Fourier Transform section 607. These transmission parameters (guard interval, subcarrier frequency interval and the number of subcarriers) are inserted into a preamble portion of transmission data to broadcast MS.

A data portion is modulated in modulation section 608, and subsequently is subjected to Inverse Fourier Transform to be an OFDM signal. At this point, the Inverse Fourier Transform processing is performed based on the transmission parameters (guard interval, subcarrier frequency interval and the number of subcarriers) in which the guard interval determined as described above is reflected. The IFT processed OFDM signal is output to multiplexing section 610. The preamble portion is modulated in modulation section 608, subsequently subjected to spreading in spreading section 609, and output to multiplexing section 610 as a CDMA signal.

As illustrated in FIG. 8, multiplexing section 610 switches between an output (OFDM signal) from Inverse Fourier Transform section 607 and an output (CDMA signal) from spreading section 609 by switch 6101 to output to radio transmission section 611. In this way, the OFDM signal (data portion) and CDMA signal (preamble portion) are subjected to time multiplexing and output to radio transmission section 611.

Meanwhile, in the case of performing code multiplexing on the OFDM signal and CDMA signal, as illustrated in FIG. 9, the data portion is modulated in modulation section 608, spread in spreading section 6102, and undergoes Inverse Fourier Transform processing in Inverse Fourier Transform section 607 to be an OFDM signal. At this point, the Inverse Fourier Transform processing is performed based on the transmission parameters (guard interval, subcarrier frequency interval and the number of subcarriers) in which the guard interval determined as described above is reflected. The IFT processed OFDM signal is output to multiplexing section 610. The preamble portion is modulated in modulation section 608, subsequently subjected to spreading in spreading section 609, and output to multiplexing section 610 as a CDMA signal.

Multiplexing section 610 adds an output (OFDM/CDMA signal) from Inverse Fourier Transform section 607 and an output (CDMA signal) from spreading section 609 in adder 6103 to output to radio transmission section 611. In this way, the OFDM signal (data portion) and CDMA signal (preamble portion) are subjected to code multiplexing and output to radio transmission section 611. In addition, in this case, a spreading code used in spreading section 6102 needs to differ from a spreading code used in spreading section 609.

The signal multiplexed in multiplexing section 610, i.e., OFDM signal or OFDM/CDMA signal (data portion) and CDMA signal (Preamble portion) is transmitted to MS as a downlink signal.

When receiving the downlink signal, MS performs despreading on the preamble portion of the downlink signal to demodulate, and thus extracts transmission parameters inserted into the preamble portion. The transmission parameters (guard interval, subcarrier frequency interval and the number of subcarriers) are output to Fourier Transform section 703.

Fourier Transform section 703 performs Fourier Transform processing on the data portion based on the extracted transmission parameters. The FT processed signal is demodulated in demodulation section 704, and output as received data. In addition, in the case of OFDM/CDMA signal subjected to code multiplexing, the signal is subjected to Fourier Transform processing, then to despreading, and is obtained as received data.

Thus, according to this embodiment, a data portion is transformed into an OFDM signal, a preamble portion is transformed into a CDMA signal, both signals are multiplexed (time multiplexing and code multiplexing) and transmitted over the downlink signal, MS generates a delay profile and transmits the delay profile over the uplink, and BS determines a guard interval using the delay profile.

Also in such a case, the need is eliminated of setting a guard interval using an OFDM signal with insufficient time resolution and it is thereby possible to set guard intervals with high accuracy. It is thus possible to ensure the transmission quality while preventing a useless guard interval from being set and to improve the spectral efficiency.

Third Embodiment

This embodiment explains a case of determining OFDM transmission parameters (guard interval, subcarrier frequency interval and the number of subcarriers), modulation scheme and coding rate of FEC using information such as received quality, Doppler shift and delay profile in MS.

Figure 10:
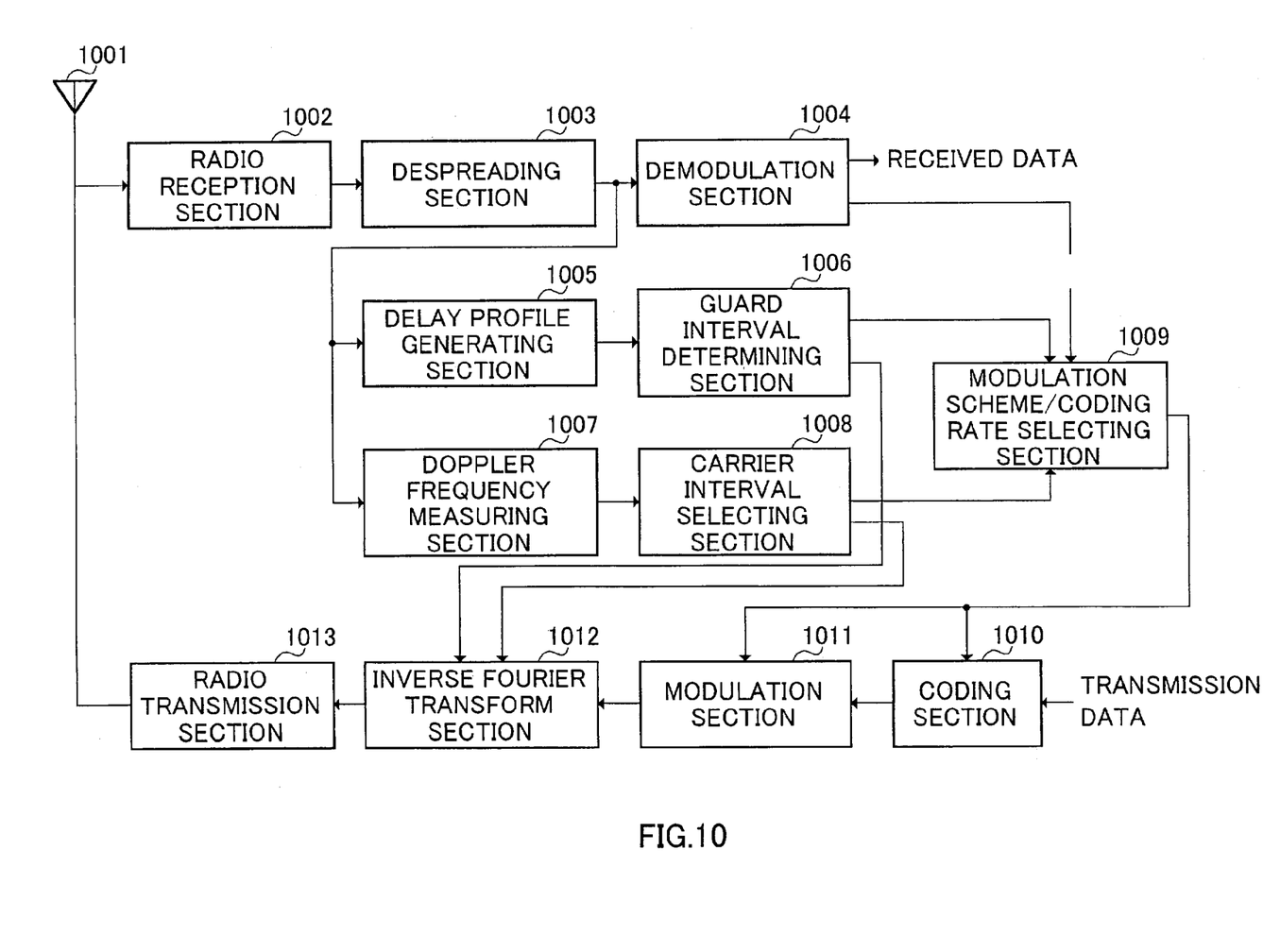
FIG. 10 is a block diagram illustrating a configuration of a radio base station apparatus according to a third embodiment of the present invention.

FIG. 10 is a block diagram illustrating a configuration of BS according to the third embodiment of the present invention.

An uplink signal transmitted from MS is received in radio reception section 1002 through antenna 1001. Radio reception section 1002 performs predetermined reception processing (such as, for example, downconverting and A/D conversion) on the uplink signal, and outputs the radio-reception-processing processed signal to despreading section 1003.

Despreading section 1003 performs despreading on the radio-reception-processing processed signal with the same spreading code as used in MS, and outputs the despread signal to demodulation section 1004, delay profile generating section 1005 and Doppler frequency measuring section 1007. Demodulation section 1004 demodulates the despread signal and outputs received data. The received quality information of the downlink of the demodulated signal is output to modulation scheme/coding rate selecting section 1009.

Delay profile generating section 1005 generates a delay profile using the despread signal. The delay profile is output to guard interval determining section 1006. Using the delay profile, guard interval determining section 1006 determines a guard interval. Information of the determined guard interval is output to Inverse Fourier Transform section 1012 and modulation scheme/coding rate selecting section 1009.

Doppler frequency measuring section 1007 measures the Doppler frequency using the despread signal, and outputs themeasurement result (Doppler shift) to carrier interval selecting section 1008. Carrier interval selecting section 1008 selects the carrier interval based on the measurement result of Doppler frequency. The selected carrier interval is output to Inverse Fourier Transform section 1008 and modulation scheme/coding rate selecting section 1009.

Modulation scheme/coding rate selecting section 1009 selects a modulation scheme (for example, the modulation level of M-ary modulation) based on the transmission parameters such as the guard interval and carrier interval. The information of the selected modulation scheme is output to modulation section 1011. The selected coding rate is output to coding section 1010.

Transmission parameters such as the guard interval, subcarrier frequency interval and the number of subcarriers are inserted into a preamble portion of transmission data. The information of modulation scheme and coding rate is also inserted into the preamble. The transmission data containing the preamble is coded in coding section 1010 with the coding rate selected as described above, and is output to modulation section 1011. Modulation section 1011 modulates the coded transmission data, and outputs the modulated signal to Inverse Fourier Transform section 1012.

Inverse Fourier Transform section 1012 performs Inverse Fourier Transform processing on the modulated signal, and outputs the IFT processed signal (OFDM signal) to radio transmission section 1013. Radio transmission section 1013 performs predetermined radio transmission processing (such as, for example, D/A conversion and upconverting) on the OFDM signal, and transmits the resultant radio signal to MS as a downlink signal through antenna 1001.

Figure 11:
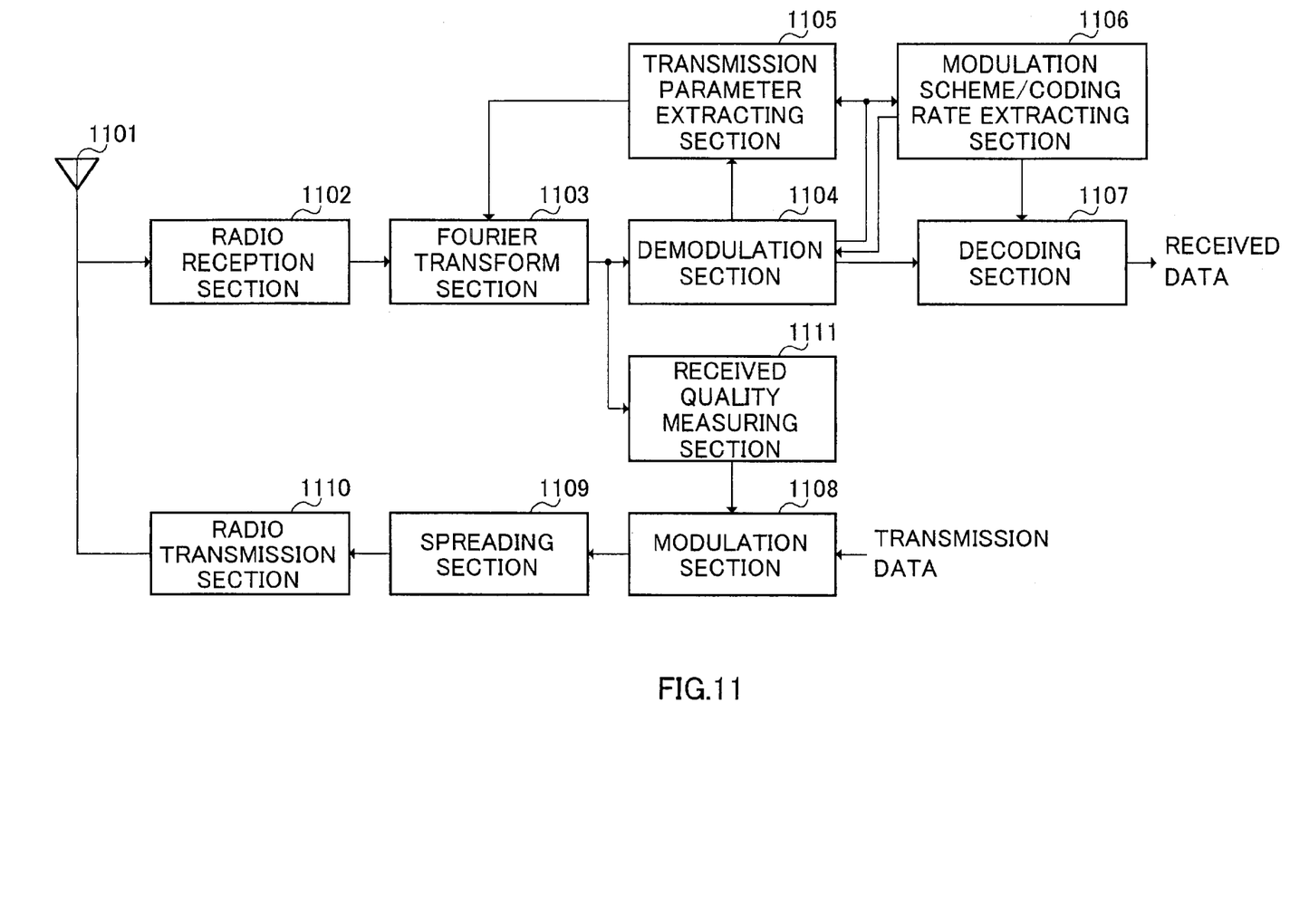
FIG. 11 is a block diagram illustrating a configuration of a communication terminal apparatus according to the third embodiment of the present invention.

FIG. 11 is a block diagram illustrating a configuration of MS according to the third embodiment of the present invention.

A downlink signal transmitted from BS is received in radio reception section 1102 through antenna 1101. Radio reception section 1102 performs predetermined reception processing (such as, for example, downconverting and A/D conversion) on the downlink signal, and outputs the radio-reception-processing processed signal to Fourier Transform section 1103.

Fourier Transform section 1103 performs Fourier Transform processing on the radio-reception-processing processed signal, and outputs the FT processed signal to demodulation section 1104 and received quality measuring section 1111. Demodulation section 1104 demodulates the FT processed signal and outputs the demodulated signal to decoding section 1107. Decoding section 1107 decodes the demodulated signal and outputs received data.

The demodulated signal is output to transmission parameter extracting section 1105 and modulation scheme/coding rate extracting section 1106. Transmission parameter extracting section 1105 extracts a preamble portion from the demodulated signal, and recognizes transmission parameters from the preamble portion. The transmission parameters are output to Fourier Transform section 1103. Fourier Transform section 1103 performs Fourier Transform based on the transmission parameters transmitted from BS.

Modulation scheme/coding rate extracting section 1106 recognizes information of the modulation scheme and coding rate from the preamble portion. The information of the modulation scheme is output to demodulation section 1104, while the information of the coding rate is output to decoding section 1107. Demodulation section 1104 performs demodulation based on the information of the modulation scheme transmitted from BS. Decoding section 1107 performs decoding based on the information of the coding rate transmitted from BS.

Received quality measuring section 1111 measures C/I that is the received quality using the FT processed signal, and outputs the measurement result to modulation section 1108. The measurement result and transmission data is modulated in modulation section 1108, and the modulated signal is output to spreading section 1109. Spreading section 1109 performs spreading on the modulated signal with a predetermined spreading code, and outputs the spread signal to radio transmission section 1110. Radio transmission section 1110 performs predetermined radio transmission processing (such as, for example, D/A conversion and upconverting) on the spread signal, and transmits the resultant radio signal to BS as an uplink signal through antenna 1101.

A case will be described below where BS and MS with the above-mentioned configurations perform radio communications according to the present invention.

MS as illustrated in FIG. 11 measures the received quality of a preamble portion of a downlink signal in received quality measuring section 1111. Then, MS modulates the measurement result of the received quality and transmission data, spreads the modulated signal in spreading section 1108, and transmits the spread signal (CDMA signal) to BS as an uplink signal.

When receiving the uplink signal (CDMA signal), BS despreads the CDMA signal in despreading section 1003, and generates a delay profile using the despread signal in delay profile generating section 1005. The delay profile is generated using the CDMA signal with high time resolution, and, therefore, is generated with high accuracy. Further, using the despread signal, Doppler frequency measuring section 1007 measures the Doppler frequency.

The delay profile generated in delay profile generating section 1005 is output to guard interval determining section 1006. Guard interval determining section 1006 determines a guard interval as in the first embodiment. The guard interval is output to Inverse Fourier Transform section 1012 as the transmission parameter information of OFDM, and also to modulation scheme/coding rate selecting section 1009.

The Doppler frequency (Doppler shift) measured in Doppler frequency measuring section 1007 is output to carrier interval selecting section 1008. Carrier interval selecting section 1008 selects the subcarrier interval based on the Doppler frequency. Further, carrier interval selecting section 1008 determines the number of subcarriers from a bandwidth used in radio communications and the subcarrier interval. The subcarrier interval and the number of subcarriers are output to Inverse Fourier Transform section 1012 as the transmission parameter information of OFDM, and also to modulation scheme/coding rate selecting section 1009.

Modulation scheme/coding rate selecting section 1009 obtains the modulation scheme and coding rate from the guard interval, subcarrier interval, the number of subcarriers, and further the Doppler frequency and received quality of downlink. Specifically, the section 1009 determines the number of symbols transmitted in a single burst from the subcarrier interval, the number of subcarriers (subcarrier parameter) and guard interval, and based on the number of symbols and the Doppler frequency, further determines the optimal coding rate. For example, since the higher Doppler frequency better randomizes portions with poor quality of the received data at a single burst and thus provides higher error correcting capability, the coding rate is set to relatively high when the Doppler frequency is high. Meanwhile, when the Doppler frequency is low, the received signal strength sometimes decreases over the entire received burst, resulting in low error correcting capability, and therefore, the coding rate is set to relatively low. In addition, the optimal coding rate is predetermined by simulation. Further, the section 1109 determines the modulation scheme (the modulation level of M-ary modulation) from the received quality of the downlink measured in MS and the coding rate.

The information of the guard interval, subcarrier frequency interval and the number of subcarriers that are of transmission parameters and also the information of the modulation scheme and coding rate is inserted into a preamble portion of transmission data to broadcast MS.

As illustrated in FIG. 4, the preamble portion containing the transmission parameters is coded as transmission data as well as a data portion, modulated and subsequently undergoes Inverse Fourier Transform processing to be an OFDM signal. At this point, the coding is performed with the coding rate selected as described above, and the modulation is performed with the modulation scheme selected as described above. Further, the Inverse Fourier Transform processing is performed based on the transmission parameters (guard interval, subcarrier frequency interval and the number of subcarriers) in which the guard interval determined as described above is reflected. The IFT processed OFDM signal is transmitted to MS as a downlink signal.

When receiving the downlink signal, MS performs Fourier Transform processing on the preamble portion of the downlink signal to demodulate, and thus extracts transmission parameters and the information of the modulation scheme and coding rate inserted into the preamble portion. The transmission parameters (guard interval, subcarrier frequency interval and the number of subcarriers) are output to Fourier Transform section 1103. The information of the modulation scheme is output to demodulation section 1104, while the information of the coding rate is output to decoding section 1107.

Fourier Transform section 1103 performs Fourier Transform processing on the data portion based on the extracted transmission parameters. The FT processed signal is output to demodulation section 1104, and therein demodulated based on the information of the extracted modulation scheme. The demodulated signal is output to decoding section 1107 and therein decoded based on the information of the extracted coding rate, and thus the received data is output.

In this way, according to this embodiment, a CDMA signal is used to generate an accurate delay profile, and based on the delay profile a guard interval is determined, whereby the need is eliminated of setting a guard interval using an OFDM signal with insufficient time resolution and it is thereby possible to set guard intervals with high accuracy. It is thus possible to ensure the transmission quality while preventing a useless guard interval from being set and to improve the spectral efficiency.

Further, according to this embodiment, it is possible to vary the modulation scheme and coding rate adaptively corresponding to the propagation path condition, and to flexibly response to the propagation environment to perform radio communications.

In addition, while this embodiment describes using C/I as the received quality, the present invention is applicable to cases of using received quality parameters (such as SIR (Signal to Interference Ratio) and received power) besides C/I as the received quality.

Further, while this embodiment describes the case where BS generates a delay profile and measures the Doppler frequency, the present invention allows MS to generate a delay profile, measure the Doppler frequency, and report the delay profile and Doppler frequency to BS.

Fourth Embodiment

The third embodiment explains determining the optimal guard interval, carrier frequency interval and the number of carriers for each user, in consideration of the fact that the delay profile and Doppler frequency are different for each user.

Over the downlink, signals for each user can be subjected to code multiplexing using OFDM/CDMA signals. In other words, over the downlink, it is possible to perform code multiplexing on information to users having the same transmission parameters (guard interval, the number of subcarriers and subcarrier interval) to transmit. However, it is not possible to perform code multiplexing on information with different transmission parameters.

In this embodiment, transmission parameters (guard interval, the number of subcarriers and subcarrier interval) are set for each user. Then, in performing code multiplexing on signals for each user to transmit in a time slot, when there is a remaining code resource, different transmission parameters are adapted to transmission parameters being transmitted currently to perform transmission.

Specifically, in a time slot for multiplexing data to users (a, b and c) with a delay time of a delayed signal of X, data of user d with a delay time of y (x>y) can be multiplexed. In this case, data of user d has a shorter guard interval than that of users a, b and c and therefore, can be transmitted at a high data rate, but is multiplexed and transmitted even though the transmission parameters are not optimal, in other words, the guard interval of user d is changed to the guard interval of users a to c to transmit the data of user d.

In this way, it is possible to improve the using rate of code resource per one slot and to improve the system throughput.

The present invention is not limited to the above-mentioned first to fourth embodiments, and is capable of being carried into practice with various modifications thereof. For example, the above-mentioned first to fourth embodiments are capable of being carried out in a combination thereof as appropriate.

As described above, according to the present invention, OFDM signals or OFDM/CDMA signals are used over the downlink, CDMA signals are used over the uplink, delay profiles are generated using the CDMA signals, and guard intervals are determined using the delay profiles with high time resolution, whereby it is possible to ensure the transmission quality while improving the spectral efficiency.

This application is based on the Japanese Patent Application No. 2001-146576 filed on May 16, 2001, entire content of which is expressly incorporated by reference herein.

INDUSTRIAL APPLICABILITY

The present invention is suitable for use in digital radio communication systems.

The invention claimed is:

1. A radio base station apparatus comprising:
   a receiving section that receives a spread uplink signal;
   a despreading processing section that performs despreading on the received uplink signal;
   a demodulating section that demodulates the despread signal and acquires delay profile information contained in the uplink signal, comprising information of a delay profile;
   a guard interval determining section that determines a guard interval in OFDM using the acquired delay profile information;
   a first modulating section that modulates a data portion;
   an OFDM processing section that performs OFDM processing on the data portion modulated in the first modulating section using the guard interval;
   a second modulating section that modulates a preamble portion comprising a known signal for use by a communication terminal apparatus to generate the delay profile;
   a first spreading section that performs spreading on the preamble portion modulated in the second modulating section;
   a multiplexing section that multiplexes the data portion subjected to the OFDM processing with the preamble portion subjected to the spreading; and
   a first transmitting section that transmits the multiplexed data portion subjected to the OFDM processing and the preamble portion subjected to the spreading as a downlink signal.

2. The radio base station apparatus according to claim 1, wherein the multiplexing section performs time multiplexing on the data portion subjected to the OFDM processing and the preamble portion subjected to the spreading.

3. The radio base station apparatus according to claim 1, further comprising:
   a second spreading section that performs spreading on the data portion modulated in the first modulating section, wherein
   the OFDM processing section performs the OFDM processing on the data portion subjected to the spreading in the second spreading section using the guard interval.

4. A communication terminal apparatus that communicates with the radio base station apparatus according to claim 1, the communication terminal apparatus comprising:
   a receiving section that receives the downlink signal,
   a despreading section that performs despreading on the preamble portion of the received downlink signal and outputs a despread signal;
   a delay profile generating section that generates a delay profile using the despread signal;
   a transmission parameter extracting section that extracts OFDM transmission parameters from the despread signal;
   an OFDM processing section that performs OFDM processing on the data portion of the downlink signal using the OFDM transmission parameters;
   a spreading section that performs spreading on the delay profile information comprising information of the delay profile generated by the delay profile generating section and transmission data; and
   a second transmitting section that transmits the delay profile information and the transmission data subjected to the spreading to the radio base station apparatus.

5. A radio base station apparatus comprising:
   a receiving section that receives a spread uplink signal;
   a despreading processing section that performs despreading on the received uplink signal and outputs a despread signal;
   a demodulating section that demodulates the despread signal and acquires downlink received quality information;
   a delay profile generating section that generates a delay profile using the despread signal;
   a guard interval determining section that determines a guard interval in OFDM using the delay profile;
   a Doppler frequency measuring section that measures a Doppler frequency using the despread signal;
   a transmission parameter determining section that determines a subcarrier parameter using a measurement result of the Doppler frequency;
   a modulation scheme/coding rate determining section that determines a modulation scheme and a coding rate using OFDM transmission parameters including the guard interval and the subcarrier parameter, the delay profile, the Doppler frequency and the downlink received quality information;
   an OFDM processing section that performs OFDM processing on transmission data and a known signal into which the OFDM transmission parameters, the modulation scheme and the coding rate are inserted; and
   a first transmitting section that transmits the signal subjected to the OFDM processing as a downlink signal.

6. A communication terminal apparatus that communicates with the radio base station apparatus according to claim 5, the communication terminal apparatus comprising:
   a receiving section that receives the known signal transmitted from the radio base station apparatus;
   a transmission parameter extracting section that extracts OFDM transmission parameters from the received known signal;
   a modulation scheme/coding rate extracting section that extracts a modulation scheme and a coding rate from the known signal;
   an OFDM processing section that performs OFDM processing on a received signal using the OFDM transmission parameters;
   a demodulating section that demodulates the received signal based on the modulation scheme;
   a decoding section that decodes the demodulated signal based on the coding rate;
   a received quality measuring section that measures received quality using the received signal;
   a spreading section that performs spreading on a measurement result of the received quality and transmission data; and
   a second transmitting section that transmits the measurement result and the transmission data subjected to the spreading to the radio base station apparatus.

7. A radio communication method comprising:
   in a communication terminal apparatus:
   a despreading step of performing despreading on a known signal of a spread downlink signal and outputting a despread signal;

a delay profile generating step of generating a delay profile using the despread signal; and a first transmitting step of performing spreading on information of the delay profile and transmitting the information in an uplink signal to a radio base station apparatus; and in the radio base station apparatus:

a receiving step of receiving the uplink signal;

a despreading step of performing despreading on the received uplink signal;

a demodulating step of demodulating the despread signal subjected to the despreading and acquiring delay profile information contained in the uplink signal;

a guard interval determining step of determining a guard interval in OFDM using the acquired delay profile information;

a first modulating step of modulating a data portion;

a first OFDM processing step of performing OFDM processing on the data portion modulated in the first modulating step using the guard interval;

a second modulating step of modulating a preamble portion comprising a known signal for use by the communication terminal apparatus to generate the delay profile;

a first spreading step of performing spreading on the preamble portion modulated in the second modulating step;

a multiplexing step of multiplexing the data portion subjected to the OFDM processing with the preamble portion subjected to the spreading; and a transmitting step of transmitting the multiplexed data portion subjected to the OFDM processing and the preamble portion subjected to the spreading as a downlink signal to the communication terminal apparatus.

8. The radio communication method according to claim 7, further comprising:

in the conamunication terminal apparatus;

a transmission parameter extracting step of extracting OFDM transmission parameters from the preamble portion of the downlink signal; and a second OFDM processing step of performing OFDM processing on the data portion of the downlink signal using the OFDM transmission parameters, wherein:

when there is an available code resource in a transmission path parameter of the downlink, the first OFDM processing step performs the OFDM processing while adapting the OFDM transmission parameters to be set in communication terminal apparatuses; and the multiplexing step performs code multiplexing on the data portion subjected to the OFDM processing and the preamble section subjected to the spreading in signals subjected to the OFDM processing while adapting the OFDM transmission parameters addressed to the communication terminal apparatuses.

9. A radio communication method comprising:

a receiving step of receiving a spread uplink signal at a radio base station apparatus;

a despreading step of performing despreading on the received spread uplink signal and outputting a despread signal;

a demodulating step of demodulating the despread signal and acquiring downlink received quality information;

a delay profile generating step of generating a delay profile using the despread signal;

a guard interval determining step of determining a guard interval in OFDM using the delay profile;

a Doppler frequency measuring step of measuring a Doppler frequency using the despread signal; a transmission parameter determining step of determining a subcarrier parameter using a measurement result of the Doppler frequency;

a modulation scheme/coding rate determining step of determining a modulation scheme and coding rate using OFDM transmission parameters including the guard interval and the subcarrier parameter, the delay profile, the Doppler frequency and downlink received quality contained in the uplink signal;

a first OFDM processing step of performing OFDM processing on transmission data and a known signal into which the OFDM transmission parameters, the modulation scheme and the coding rate are inserted; and a first transmitting step of transmitting a signal subjected to the OFDM processing to a communication terminal apparatus as a downlink signal, and in the communication terminal apparatus:

a transmission parameter extracting step of extracting the OFDM transmission parameters from the known signal;

a modulation scheme/coding rate extracting step of extracting the modulation scheme and the coding rate from the known signal;

a second OFDM processing step of performing OFDM processing on a received signal using the OFDM transmission parameters;

a demodulating step of demodulating the received signal based on the modulation scheme;

a decoding step of decoding the demodulated signal based on the coding rate;

a received quality measuring step of measuring received quality using the received signal; and a second transmitting step of transmitting the downlink received quality information comprising the measured received quality.

* * * * *